UNITED STATES PATENT OFFICE.

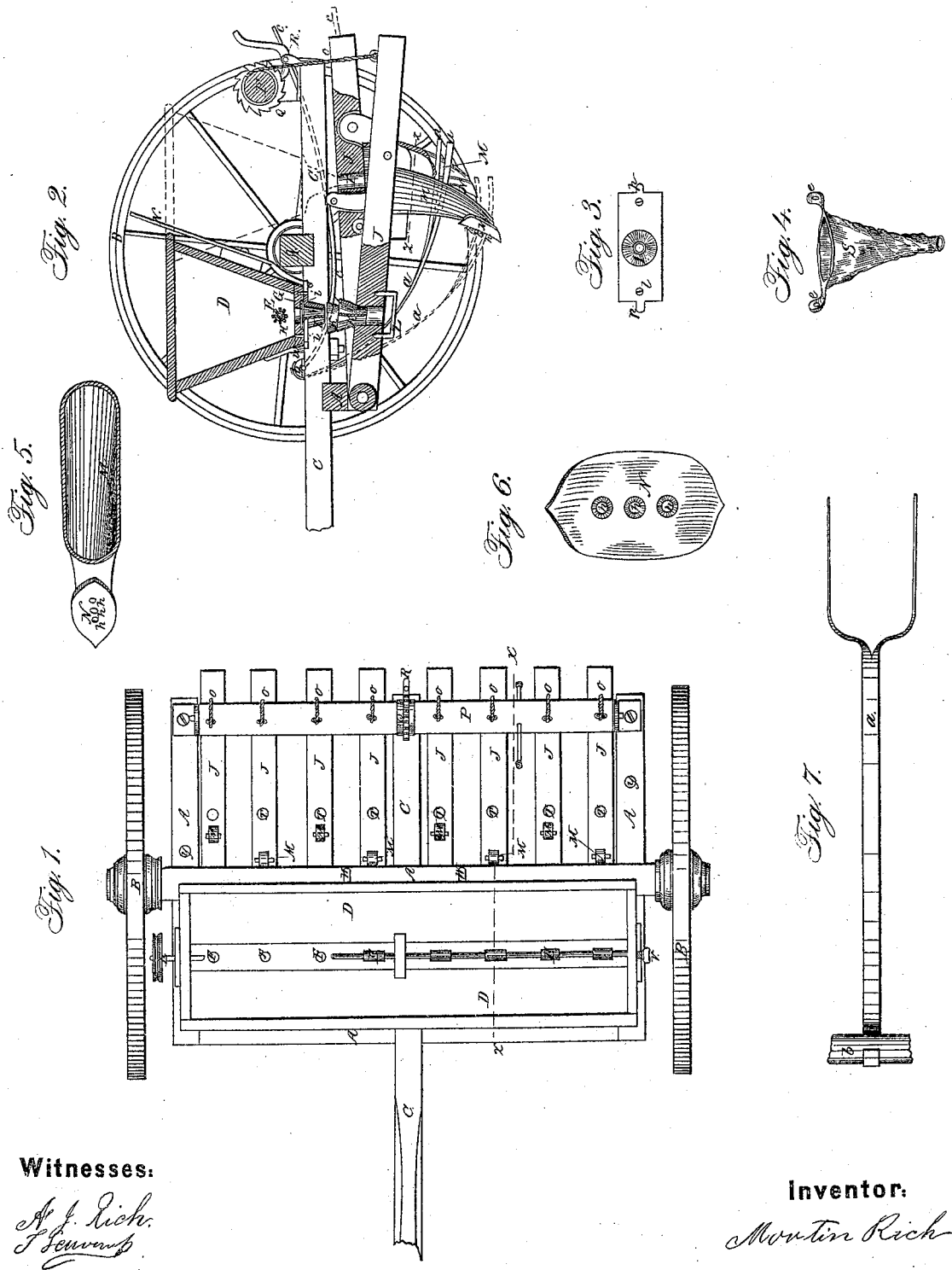

MARTIN RICH, OF HORICON, WISCONSIN.

IMPROVEMENT IN GRAIN-DRILLS.

Specification forming part of Letters Patent No. 40,770, dated December 1, 1863.

*To all whom it may concern:*

Be it known that I, MARTIN RICH, of Horicon, in the county of Dodge and State of Wisconsin, have invented a new and useful Improvement in Seeding-Machines; and I do hereby declare that the following is a full, clear, and exact description of the construction and operation of the same, reference being had to the annexed drawings, making a part of this specification, in which—

Figure 1 is a plan view of the machine with the cover of the seed-hopper removed. Fig. 2 is a longitudinal section of the machine on the line $x\ x$. Fig. 3 is a bottom view of the seed-funnel and plate. Fig. 4 is a perspective view of the flexible tube or chute. Fig. 5 is a transverse section of the drill-tooth on the line $z\ z$ of Fig. 2. Fig. 6 is a front view of the drill-share. Fig. 7 is a top view of the clearer.

My invention consists, first, in adapting the same machine to sowing either broadcast or in drills by the simple device of transferring the seed-hopper from the front to the rear end of the frame; and, secondly, in the construction of the plate of the seed-funnel, whereby the flexible chute may readily be attached and removed; thirdly, in making the entrance of the drill-tooth oblong in shape and of unusual length, thereby enabling the tooth to be set forward or backward while yet always presenting its aperture to the hole in the drag-bar, and thus allow the seeds to drop perpendicularly into the tooth, instead of bending the chute and causing it to buckle, whereby the seeds would be obstructed in their passage; fourthly, the peculiar construction of the flexible chute, whereby its attachment to or removal from the machine is facilitated; fifthly, in providing a clearer which frees the machine from the weeds or vines which lodge against the teeth.

To enable others to make and use my invention, I will proceed to describe its construction and operation.

A is the frame, constructed in the ordinary manner. B B are the wheels. D is the hopper or seed-box. C is the tongue. E is the stirrer. F F are the seed-holes. G is the measuring-slide. H is the cut-off slide. I I are the funnel-chutes. $i\ i$ are the funnel-plates. J J are the drag-bars. K K are the funnel-cups. L is the scattering-rod. M M are the drill-teeth. N N are the drill-shares. O O are the cords or chains supporting the drag-bars. P is the windlass for raising the drag-bars. Q is the ratchet. R is the pawl to maintain the drag-bars at any desired elevation from the ground. S is the flexible chute, connecting the funnels with the hollow drill-teeth through the holes T T. $a$ is the clearer, consisting of a bar or arm, of any suitable material, bifurcated at the rear or lower end in the manner shown in Fig. 7, and attached at the upper end to a roller, $b$. The lever $c$ is attached rigidly to the roller $b$, and extends under and behind the machine. The bifurcated end of the clearer is spread to correspond with the space between two of the drill-teeth, and the machine is provided with as many of these clearers as there are such spaces, and they are all attached to one roller of the entire width of the frame, and operated by one lever, in the manner hereinafter specified.

The frame A, wheels B, hopper D, stirrer E, funnels I, slides G and H, drag-bars J J, cups K K, scatterer L, cords or chains O O, windlass P, ratchet and pawl Q and R are all constructed in any usual or suitable manner; but the funnel-plate $i$, I provide with a projection at each end, $p\ p$, for the purpose of attaching the flexible chute S to the funnels I, as will be more fully set forth hereinafter.

The drill-teeth M M, I construct much deeper from front to rear at the upper end than is commonly done, for the following reason: As it is deemed desirable to arrange the drill-teeth irregularly, so that each alternate tooth is placed farther forward than the others, it becomes necessary to arrange the seed-holes in the bottom of the hopper in a correspondingly irregular manner, or to provide inclined chutes. Both of these methods are objectionable; but by making the drill-teeth sufficiently deep from front to rear at the upper end, as shown in Figs. 2 and 5, the drill-teeth may be moved forward to the desired position, while the openings will remain in a position directly under the funnels, so that the seed may fall freely and unobstructedly into the drills.

The drill-shares are constructed in a common form; but I provide them with a series of bolt-holes, (see $h\ h$, Fig. 6,) so that as they become short by use or sharpening they may be shifted or set down on the drill-tooth, thus adding greatly to their durability.

The flexible chute S is made in the ordinary manner, with the addition of two ears or tags, *e e*, as shown in Fig. 4, each of which is provided with a small slit or button-hole. When it is desired to attach them to the seed-funnels one of the tags is slipped over each of the projections of the funnel-plates *p p*, thus enabling them to be attached with great facility and ease.

The operation of the machine is as follows: When the machine is to be used for sowing broadcast the hopper is placed on the frame in front of the axle, the funnels I I being directly over the funnel-cups K K, and is held in that position by two bolts, *u u*, which pass through the frame A and are secured by nuts. The measuring-slide G is adjusted by means of the thumb-screw V, and when the seed is required to flow the vents are opened by moving the shut-off slides by means of the levers W. The stirrer is revolved by means of a belt running on a pulley on the end of the axle of the stirrer, and another pulley turned on the inner end of the hub of the wheel. The shut-off slides being opened, the seed flows freely through the vents and funnels I I into the cups K, striking upon the scattering-rods L L, which distributes them evenly and perfectly over the ground. The shares *n n* then cover the seeds in the most effectual manner.

When the machine is to be used for planting in drills the nuts on the bolts *u u* are removed, the hopper is lifted and placed on the frame behind the axle in the position indicated by the red lines. The bolts are then passed through the holes *y y*, and the seed-funnels are directly above the holes leading into the hollow drill-teeth. The flexible chutes are then attached in the manner before specified, the ends are passed down into the drill-teeth, and the machine is ready for drilling. As the drill-teeth are liable to become clogged and obstructed by the stubble, weeds, and vines in the field, and thereby rendered in a great measure inoperative, to remedy this I provide the machine with the bifurcated arm *a* and its attachments, which are operated as follows: When the weeds, &c., are accumulated in front of the drill-teeth the lever *c* is pressed down toward the ground, thereby rotating the roller and forcing the bifurcated ends of the arms *a* toward the ground, carrying with them all the obstructing matter, and at this juncture by slightly raising the rear ends of the drag-bars by means of the windlass P the drill-teeth are elevated and will pass over the rubbish cleared off by the arm, and be completely free.

The advantages of the machine with my improvements are simplicity and economy of time and labor, as well as in the implements necessary to accompany it. With no other tool than a simple wrench any one, howsoever unskilled in such matters, may in the space of a few minutes transform the machine into a broadcast from a drill, or vice versa, as may be required, while by my plan of constructing the aperture of the drill-tooth the utmost regularity in the flow of the seed is attained. By placing in the seed-holes in the rear end of the drag-bar cups similar in form though larger in size than those in the front end, the use of the flexible chute may be dispensed with in drilling, as these cups would prevent the wind from blowing the seeds out of the machine, and would conduct them quite as effectually into the cavity of the drill-tooth, and thus still further simplify the construction and operation of the apparatus.

What I claim as my invention, and desire to secure by Letters Patent, is—

1. A seeding-machine so constructed that the seed-hopper may be transferred from the front to the rear end of the frame, thereby adapting the same machine to sowing either broadcast or in drills, substantially as set forth.

2. The drill-tooth, with the upper end constructed in the elongated form, for the purpose set forth.

3. The clearer *a*, for freeing the teeth from rubbish, constructed and operated substantially as described.

MARTIN RICH.

Witnesses:
  A. J. RICH,
  J. SCRIVENER, Jr.